US012589883B2

(12) United States Patent　　　　　　(10) Patent No.:　US 12,589,883 B2
Douthitt et al.　　　　　　　　　　　　(45) Date of Patent:　　Mar. 31, 2026

(54) FLIGHT RECORDER SYSTEM AND METHOD

(71) Applicant: GENERAL ELECTRIC COMPANY, Schenectady, NY (US)

(72) Inventors: Brian Lynn Douthitt, Holland, MI (US); Theodore William Gerken, Grand Rapids, MI (US); Samuel Nyall Stearley, Kentwood, MI (US)

(73) Assignee: General Electric Company, Evendale, OH (US)

( * ) Notice: Subject to any disclaimer, the term of this patent is extended or adjusted under 35 U.S.C. 154(b) by 257 days.

(21) Appl. No.: 18/355,841

(22) Filed: Jul. 20, 2023

(65) Prior Publication Data

US 2025/0026486 A1　　Jan. 23, 2025

(51) Int. Cl.
　　*B64D 45/00*　　　　(2006.01)
　　*H04L 67/12*　　　　(2022.01)
(52) U.S. Cl.
　　CPC ...... *B64D 45/00* (2013.01); *B64D 2045/0065* (2013.01); *H04L 67/12* (2013.01)
(58) Field of Classification Search
　　CPC .. B64D 45/00; B64D 2045/0065; H04L 67/12
　　See application file for complete search history.

(56) References Cited

U.S. PATENT DOCUMENTS

| | | | |
|---|---|---|---|
| 4,817,046 A | 3/1989 | Rice et al. | |
| 8,417,995 B2 | 4/2013 | Davy et al. | |
| 10,553,120 B2 | 2/2020 | Schmutz et al. | |
| 10,636,229 B2 | 4/2020 | Hansel et al. | |
| 11,354,202 B1 | 6/2022 | Miller et al. | |
| 2009/0319102 A1* | 12/2009 | Winterhalter | G07C 5/085 |
| | | | 701/14 |
| 2010/0231049 A1 | 9/2010 | Hinton et al. | |
| 2016/0176538 A1 | 6/2016 | Bekanich | |
| 2018/0171874 A1 | 6/2018 | Klonowski et al. | |
| 2018/0205658 A1* | 7/2018 | Sullivan | H04W 4/42 |
| 2021/0333792 A1* | 10/2021 | Murch | G05D 1/226 |
| 2024/0078024 A1 | 3/2024 | Ge | |

FOREIGN PATENT DOCUMENTS

| | | | |
|---|---|---|---|
| FR | 2918188 A1 | 1/2009 | |
| TW | 201419300 A | 5/2014 | |
| WO | 2015/145031 A1 | 10/2015 | |
| WO | 2022226840 A1 | 11/2022 | |

\* cited by examiner

*Primary Examiner* — Steven Vu Nguyen
(74) *Attorney, Agent, or Firm* — McGarry Bair PC

(57)　　　　　　ABSTRACT

A CVFDR system of an aircraft includes a cockpit voice and flight data recorder (CVFDR) communicatively coupled, via a data communication network, to a set of flight recorder modules. The CVFDR receives a first voltage from a remote first power source. In the event of an interruption of the first voltage, the CVFDR receives a second voltage from a local second power source for a predetermined period.

19 Claims, 5 Drawing Sheets

FLIGHT RECORDER SYSTEM AND METHOD

TECHNICAL FIELD

This disclosure relates generally to aircraft flight recorders, and more specifically to a cockpit voice and flight data recorder system and a method of operation.

BACKGROUND

Flight recorders (sometimes called 'black box' recorders) are devices used to acquire and store information about the operation and status of an aircraft during a flight. This information is analyzed in response to an unexpected event or accident involving the aircraft and helps reconstruct the events leading to the event. Flight recorders are installed on certain aircraft, typically large or passenger carrying aircraft, and conform to international aviation authority standards. For example, flight recorders are mandated for commercial aircraft by the Federal Aviation Administration (FAA) in the United Stated (U.S.), and the European Union Aviation Safety Agency (EASA) in the European Union.

Typically, a cockpit voice recorder (CVR) is provided to record a flight crew's voices, as well as other sounds inside the aircraft cockpit. The CVR includes a "cockpit area microphone" to capture sounds of interest such as engine noise, stall warnings, landing gear extension and retraction, and other clicks and pops. From these sounds, parameters such as engine rpm, system failures, speed, and the time at which certain events occur can often be determined. Communications with Air Traffic Control, automated radio weather briefings, and conversation between the pilots and ground or cabin crew are also recorded. Other examples of information captured and stored on the flight data recorder include position, speed, altitude, engine speed and rudder position, however modern flight data recorders often track, store, and analyze hundreds of parameters.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

3B is a graph depicting another example of an operation of a control module of cockpit voice and flight data recorder system in accordance with aspects described herein.

Figure 4:
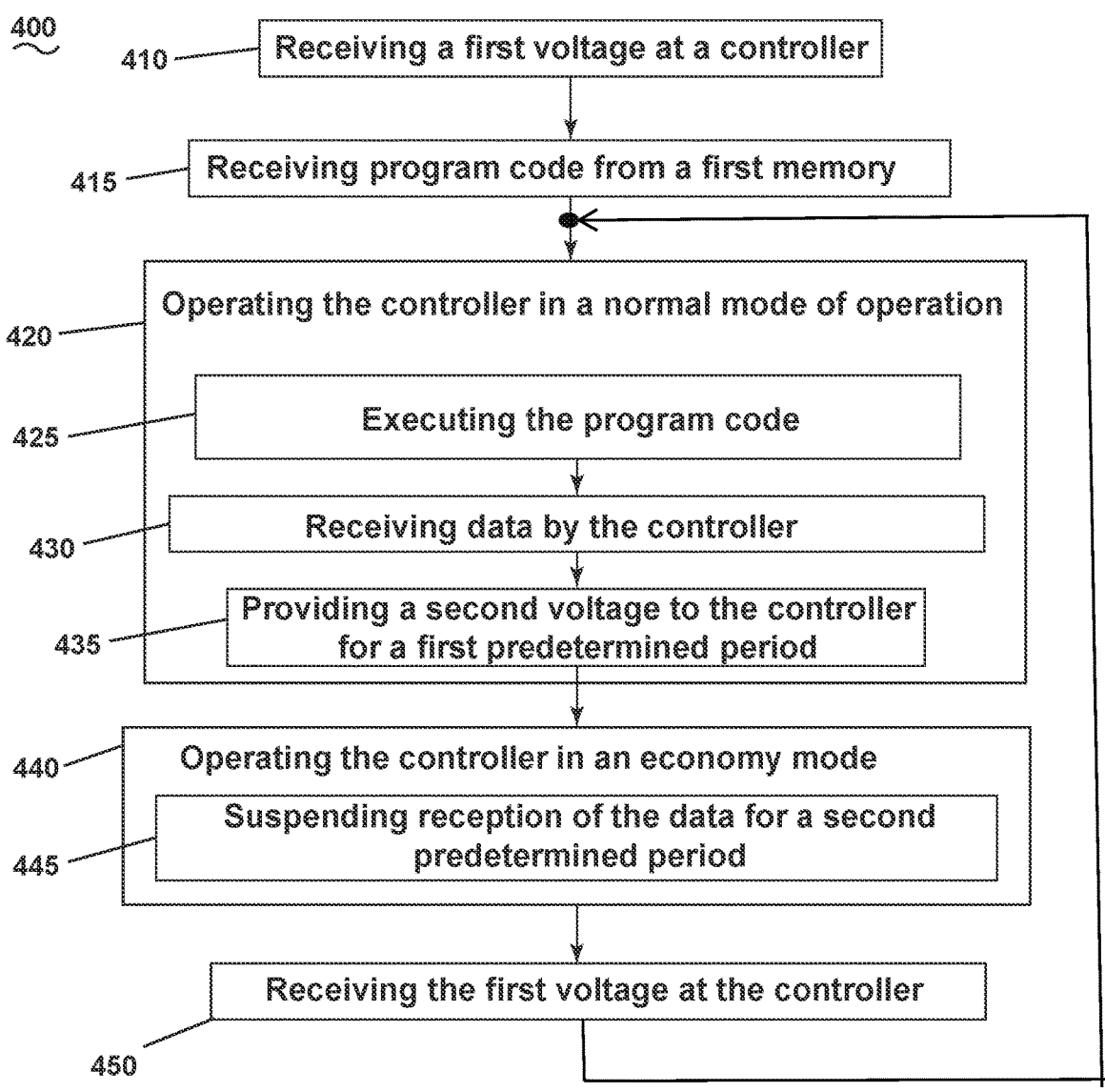

FIG. 4 is a flow chart diagram illustrating a method of operating a cockpit voice and flight data recorder system in accordance with aspects described herein.

DETAILED DESCRIPTION

For purposes of illustration and discussion, the present disclosure will be described with respect to a cockpit voice and flight data recorder system for an aircraft. It will be understood that the disclosure can have applicability in other vehicles or systems, and can be used to provide benefits in industrial, commercial, and residential applications that use or require recorded data.

The exemplary drawings are for purposes of illustration only and the dimensions, positions, order and relative sizes reflected in the drawings attached hereto can vary.

As used herein, all directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection or communicative connection between respective elements. Furthermore, as used herein, the term "set" or a "set" of elements can be any number of elements, including only one.

As used herein, a "controller" or "control module" can include a component configured or adapted to provide instruction, control, operation, or any form of communication for operable components to affect the operation thereof. A controller module can include, without limitation, any known processor, microcontroller, System-on-Chip (SoC), or logic devices. Such logic devices can include but are not be limited to: Field Programmable Gate Arrays (FPGA), a Complex Programmable Logic Device (CPLD), an Application-Specific Integrated Circuit (ASIC), a Full Authority Digital Engine Control (FADEC), a Proportional Controller (PC), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof.

Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. As used herein, the terms "program code", "executable code", "software", and "firmware" can be used interchangeably, and can be used to describe operable or executable instruction sets that can include routines, programs, code, bit streams, objects, components, data structures, algorithms, etc., that have the technical effect of performing particular tasks or implementing particular abstract data types. When implemented in software or firmware, various aspects as described herein can include code segments or instructions that perform the various tasks. It should be appreciated that the various block components shown in the figures can be realized by any number of hardware, software, or firmware components, or combinations thereof, configured to perform the specified functions.

In another non-limiting example, a controller module can also include a data storage component accessible by the processor, including memory, whether transition, volatile or non-transient, or non-volatile memory. Additional non-limiting examples of the memory can include Random Access Memory (RAM), Read-Only Memory (ROM), flash memory, or one or more different types of portable electronic memory, such as discs, Digital Versatile disks (DVDs), Compact Disc-Read-Only Memory (CD-ROMs), flash drives, Universal Serial Bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

Conventional flight recorders are electronic recording devices or modules installed in an aircraft to facilitate the investigation of aviation accidents and incidents. Typically, flight recorders continually monitor the current operating conditions and performance of the aircraft via a large number of sensors or other data sources located around the aircraft. The data from the sensors can be provided to a flight recorder module (FRM) which provides the data to a Cockpit Voice Recorder (CVR), or a Flight Data Recorder (FDR) via a data communication system of the aircraft. The CVR records radio transmissions and sounds in the cockpit, such as the pilot's voices and engine noises. The Flight Data Recorder (FDR), monitors specific aircraft performance parameters such as altitude, airspeed, heading, vertical acceleration, time, nose heading, steering wheel position, rudder pedal position, steering wheel position, horizontal stabilizer, and fuel flow. Some sensor data can also be provided directly to the flight recorder. In some cases, the CVR and FDR can be combined into a single unit, Cockpit Voice and Flight Data Recorder (CVFDR). As will be used herein, for case of description and understanding, the term "CVFDR" will refer to one or more devices comprising a CVR, or an FDR, or both. The CVFDR can include an electronic interface and a housing that encloses each circuit, and can include a crash survivable memory unit (CSMU). The CSMU typically includes has a non-volatile memory for storing flight data and voice data. Other flight recorder devices or modules such as data analytics modules (DA) can be arranged to receive flight data corresponding to various predetermined flight parameters from various devices including other flight recorder modules in the cockpit voice and flight data recorder system, and can include a dedicated processor to perform an analysis of the data. The analysis can be conducted during flight by the DA, or post-flight. Flight recorder devices can include any number of devices or modules configured to capture data indicative of any desired number of parameters relative to the aircraft, including detected, measured, sensed, calculated, derived, or otherwise determined data.

Flight recorder devices can be configured as a set of fixed aircraft components, such as a set of line-replaceable units (LRUs). In many instances, the flight recorder LRU can comprise an FRM that receives and processes audio or other flight data from various data sources such as sensors, monitors, instruments, and the like. The FRM can be communicatively coupled to the CVFDR via a communication network of the aircraft to provide the data to the CVFDR in accordance with known protocols.

The CVFDR is usually powered from a generator or other electrical source via an electrical bus of the aircraft. Since in some instances, such as an unexpected event or accident, the aircraft may lose electrical power that normally supplies the CVFDR, some aviation regulatory authorities require a backup power source be available. For example, the European Organization for Civil Aviation Equipment (EUROCAE) document ED-112A, Minimum Operational Performance Specification for Crash Protected Airborne Recorder Systems require that aircraft CVFDR include an independent power source (e.g., a capacitor or a battery) that is located with the recorder and that activates automatically to power the recorder for ten minutes plus or minus one minute of operation, whenever the primary aircraft power is unavailable, either due to manual shutdown or electrical system failure.

Additionally, the EUROCAE document ED-112A, further requires that for a short-time power interruption from the main or backup power sources, an aircraft CVFDR must be able to continue operation for at least a 2-sec power interruption and be able to resume normal operation within 500 milliseconds. Accordingly, to meet this short-time power interruption requirement, conventional CVFDRs are often provided with a secondary power source such as a capacitor or battery that can provide a predetermined minimum voltage to the CVFDR for the short time duration (e.g., 2 seconds). Typically, the secondary power source (e.g., a capacitor) is sized or selected based in part on a predicted or calculated rate of decay of the voltage provided by the secondary power source. The rate of decay of the voltage of the secondary power source (e.g., a capacitance "C") can be easily calculated or estimated based on the anticipated electrical load (e.g., a resistance "R") provided by the CVFDR, and a time constant (RC) of the circuit, using known techniques. As will be appreciated, for a given predetermined time period (e.g., 2 seconds), at a predetermined rate of decay (e.g., based on the time constant "RC" of the circuit) of the voltage (e.g., 28 volts DC) provided by the secondary power source, to maintain a predetermined minimum voltage (e.g., 18 volts DC) for a particular CVFDR, the size and weight of the secondary power source (e.g., capacitor) will be based on or proportional to the power demand (e.g., in watts) of the CVFDR during the time period. That is, for CVFDRs having a relatively low power demand (e.g., 14 watts) during the time period, a relatively small secondary power source (e.g., a 22 milli-Farad capacitor) can be used to maintain a minimum voltage threshold (e.g., 18 volts DC). Conversely, for CVFDR having a relatively higher-power demand (e.g., 21 watts), a larger capacitor (e.g., a 25 milli-Farad capacitor) would be needed to maintain the same minimum voltage threshold (e.g., 18 volts DC). It will be appreciated that the size, weight, and cost of the capacitor will typically increase with increasing capacitance, and this can further result in a consequent increase to the overall size and weight of the CVFDR. Accordingly, it would be desirable to reduce the size, weight, and cost of the temporary power source.

Aspects as described herein are configured to reduce the electrical power demand of the CVFDR during the predetermined short time duration (e.g., 2 seconds) to enable the use of a smaller, lighter, less expensive temporary power source (e.g., capacitor or battery). Additionally, aspects as described herein provide a CVFDR that is operative to temporarily reduce (i.e., during the time period (e.g., 2 seconds)) a power demand during an interruption of the primary power source (e.g., aircraft power) in order to reduce the minimum size of the temporary power source (e.g., capacitor or battery) while still meeting regulatory performance requirements. As will be described in more detail herein, a CVFDR is arranged to operate in a normal mode of operation while receiving power from a first voltage source remote from the CVFDR. In response to an interruption of the first voltage, the CVFDR is configured to receive a second voltage from a second local power source and continue to operate in the normal mode of operation for a first predetermined period of time (e.g., 500 milliseconds). At a conclusion of the first predetermined period of time, the CVFDR is configured to operate in a reduced power or economy mode of operation for a second predetermined period of time (e.g., 1.5 seconds). While operating in the economy mode of operation (i.e., during the second predetermined period), the CVFDR uses or demands less power (e.g., 10 watts) from the second power source than when operating in the normal mode of operation (e.g., 21 watts) during the first predetermined period of time. For example, in one non-limiting exemplary implementation, by reducing the electrical power demand of the CVFDR during the predetermined short time duration (e.g., 2 seconds), as disclosed herein, a CVFDR can employ a 20% smaller temporary power source (e.g. a 20 millifarad capacitor) than would otherwise be required (e.g., a 25 millifarad capacitor) to maintain the minimum voltage threshold (e.g., 18 volts DC) for the predetermined short time duration (e.g., 2 seconds), resulting in a 30% weight reduction (e.g., from 9 pounds to 6 pounds) of the CVFDR over conventional techniques.

Figure 1:
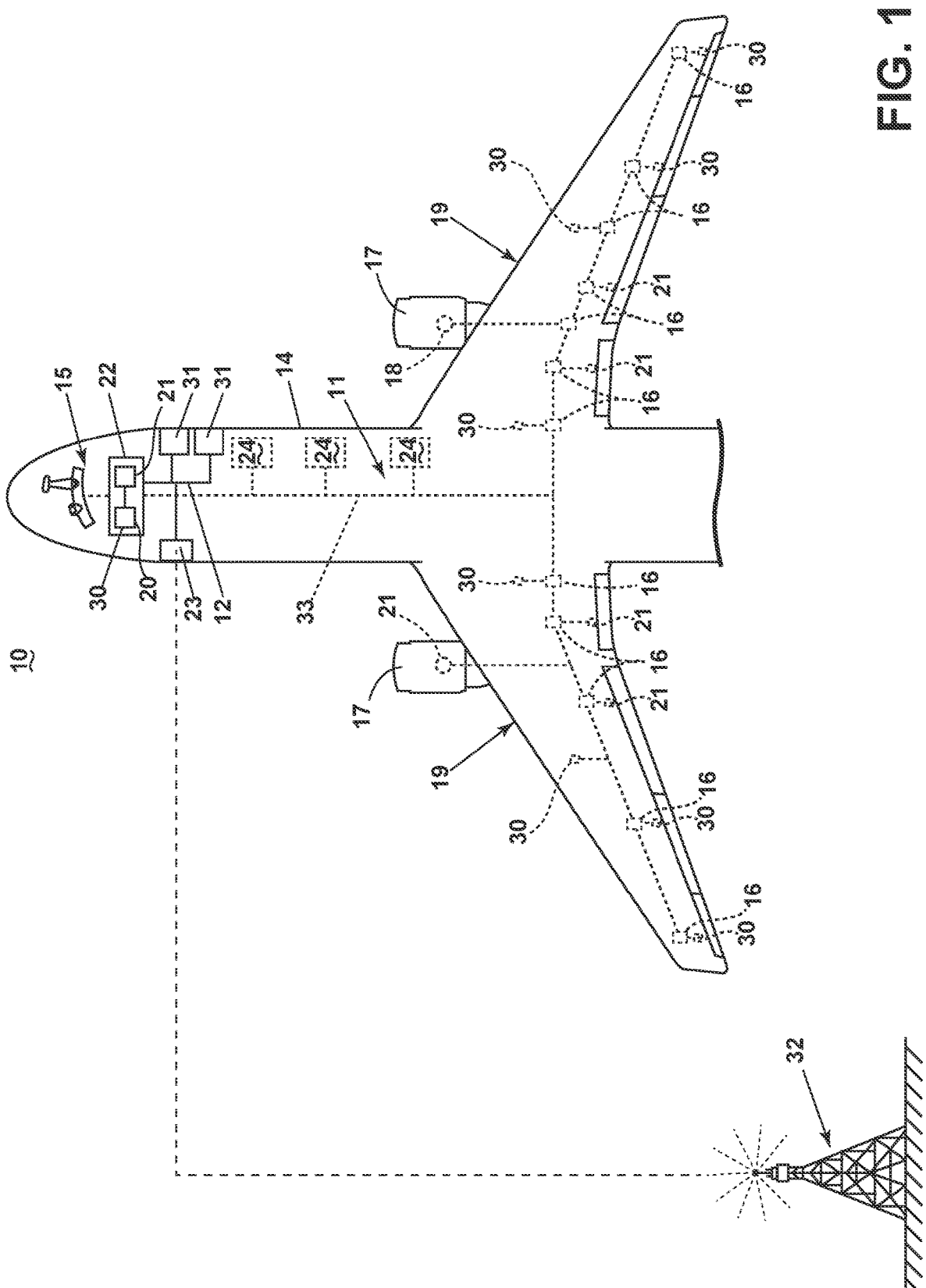
FIG. 1 is a schematic illustration of an aircraft and ground system in accordance with aspects described herein.

FIG. 1 depicts an aircraft 10 that provides an example of an environment for different aspects of the disclosure. The aircraft 10 can fly a route from one location to another (i.e., a flight) and can include a power system 11 including one or more propulsion engines 17 coupled to a fuselage 14. A cockpit 15 can be positioned in the fuselage 14 and wing assemblies 19 can extend outwardly from the fuselage 14. Further, a set of aircraft systems 20 that enable proper operation of the aircraft 10 can be included as well as a controller or computer 22, and a data communication network 12 having a communication link 23. The aircraft computer 22 can include also include a user interface or display (not shown). The display can be any user interface, screen, or known computer system or combination or computer systems that can communicate or otherwise provide an output to one or more users (e.g., a pilot) of the computer 22. In non-limiting aspects, the aircraft computer 22 can comprise a Flight Management System (not shown).

The set of aircraft systems 20 can reside within the cockpit 15, within the electronics and equipment bay (not shown), as well as in other locations throughout the aircraft 10. Such aircraft systems 20 can include but are not limited to an electrical system, an oxygen system, hydraulics or pneumatics system, a fuel system, a propulsion system, flight management system (FMS), flight controls, audio/video systems, an Integrated Vehicle Health Management (IVHM) system, and systems associated with the mechanical structure of the aircraft 10. As discussed in more detail herein, in aspects, the set of aircraft systems 20 can include a CVFDR system 21.

The aircraft computer 22 can be operably coupled to the set of aircraft systems 20 such as the CVFDR system 21. It is contemplated that the aircraft computer 22 can aid in operating the set of aircraft systems 20 and can receive information from the set of aircraft systems 20. The aircraft computer 22 can also be connected with other controllers or computers of the aircraft 10. Additionally, or alternatively, the computer 22 can be communicatively coupled with a remote server (not shown) or a designated ground station 32, or both. The ground station 32 can be any type of communicating ground station 32 such as one operated by an Air Navigation Service Provider (ANSP)/Air Traffic Control (ATC).

The aircraft computer 22 can include memory (not shown). The aircraft computer 22 memory can include Random Access Memory (RAM), Read-Only Memory (ROM), flash memory, or one or more different types of portable electronic memory, such as discs, DVDs, CD-ROMs, etc., or any suitable combination of these types of memory. The aircraft computer 22 can include one or more controller modules or processors (not shown), which can be running any suitable programs. It will be understood that the aircraft computer 22 can include or be associated with any suitable number of individual microprocessors, power supplies, storage devices, interface cards, auto flight systems, flight management computers, controller modules, and other standard components and that the aircraft computer 22 can include or cooperate with machine executable code, any number of software (also sometimes called "firmware") programs (e.g., flight management programs), or other instructions designed to carry out the various methods, process tasks, calculations, and control/display functions necessary for operation of the aircraft 10. While not illustrated, it will be understood that any number of sensors or other systems can also be communicatively or operably coupled to the aircraft computer 22 to provide information thereto or receive information therefrom.

The CVFDR system 21 can include a set of fixed aircraft components, such as a set of line-replaceable units (LRUs) 31 which can define networking end nodes (also referred to as "end stations", "end points", or "end systems"), or modular components of the aircraft 10. The LRUs 31 can include respective control modules and be configured to operate according to a particular operation, interoperability, or form factor standards, such as those defined by Aeronautical Radio Incorporated (ARINC) 664 series or Mil-Std-1553B, standards, for example. In aspects, one or more of the LRUs 31 can comprise an FRM. In the exemplary aspects illustrated, the aircraft computer 22 can be positioned near the nose or cockpit 15 of the aircraft 10 while the LRUs 31 can be positioned in any desired location throughout the aircraft 10. The aircraft computer 22, LRUs 31, and CVFDR system 21, can be configured to be communicatively coupled by way of the data communication network 12. The data communication network 12 can comprise a series of data transmission pathways (not shown), including network bridges or switches. The data transmission pathways can include a physical connection between the respective components or end nodes of the data communication network 12 such as the aircraft computer 22 and LRUs 31, and CVFDR system 21. In non-limiting aspects, the physical connection can comprise a wired connection such as Ethernet, or can include wireless transmission connections including, but not limited to, WiFi (e.g., 802.11 networks), Bluetooth, and the like. Collectively, the aircraft computer 22, LRUs 31, data transmission pathways, and network switches can form the data communication network 12 for the aircraft 10. It is contemplated that in various aspects, the data communication network 12 can be arranged and operated in accordance with any desired data communication schema such as, without limitation, time sensitive network (TSN), time-triggered ethernet (TTE), Peripheral Component Interconnect Express (PCIe), Ethernet 10/100, and the like, without departing from the scope of the invention.

The LRUs 31 can include, for example, entirely contained systems, sensors, transducers, instruments, cameras, recorders, processors, or other auxiliary equipment to manage or operate flight recorder functions. At least a subset of LRUs 31 (e.g., an FRM) can, for example, generate data, which can be modified, computed, or processed prior to, or in preparation for, packaging the data into data frames or data packets to be transmitted over the data communication network 12. In non-limiting aspects another set of LRUs 31 can consume the data transmitted over the avionics data network. In some instances, the aircraft computer 22 or LRU 31, or both, can operate to generate or consume data, or both. As used herein, "consume," "consuming," or "consumption" of data will be understood to include, but is not limited to, performing or executing a computer program, routine, instruction, calculation, analysis, function, or process on at least a portion of the data, storing the data in memory, or otherwise making use of at least a portion of the data.

The communication link 23 can be communicably coupled to the aircraft computer 22 or other control modules or processors of the aircraft to transfer information to and from the aircraft 10. It is contemplated that the communication link 23 can be a wireless communication link and can be any variety of communication mechanism capable of wirelessly linking with other systems and devices and can include, but is not limited to, satellite uplink, satellite communications (SATCOM) internet, very high frequency (VHF) Data Link (VDL), Aircraft Communication Addressing and Reporting System (ACARS) network, Automatic Dependent Surveillance-Broadcast (ADS-B), Wireless Fidelity (WiFi), WiMax, 3G wireless signal, Code Division Multiple Access (CDMA) wireless signal, Global System for Mobile communication (GSM), 4G wireless signal, Long Term Evolution (LTE) signal, 5G wireless signal or any combinations thereof. It will also be understood that the particular type or mode of wireless communication is not critical to the disclosure, and later-developed wireless networks are certainly contemplated as within the scope of the current disclosure. Further, the communication link 23 can be communicably coupled with the aircraft computer 22 through a wired link without changing the scope of the aspects as described herein. Although only one communication link 23 has been illustrated, it is contemplated that the aircraft 10 can have multiple communication links 23 communicably coupled with the aircraft computer 22. Such multiple communication links can provide the aircraft 10 with the ability to transfer information to or from the aircraft 10 in a variety of ways. Additionally, or alternatively, the computer 22 can communicate with the remote server (not shown) located at or communicatively coupled to the designated ground station 32. Communication can be sent or received between the ground station 32 and the computer 22 via the communication link 23.

The non-limiting aspect of the aircraft 10 of FIG. 1 is shown having two propulsion engines 17, such gas turbine engines. Alternatively, the power system 11 can have fewer or additional engine systems. The propulsion engines 17 can be substantially identical, and can further include at least one power source, such as a first electric machine or a generator 18. The propulsion engines 17 can further include another power source, such as a second electric machine or generator (not shown). Non-limiting aspects of the disclosure can be included wherein, for example, the generator 18 is a primary power source and the second generator is a secondary, back-up, or redundant power source. The aircraft is shown further having a set of power-consuming components, or set of electrical loads 30, such as. for instance, an actuator load, flight critical loads, and non-flight critical loads. For ease of description and understanding, while descriptions herein will generally reference a power generator as a first power source, it will be understood that in various aspects, any number of other devices and systems can be used as a first power source, including, for example a power converter unit.

The set of electrical loads 30 are electrically coupled with at least one of the generators 18 via a power distribution system including, for instance, a set of power transmission lines 33 or bus bars, and power distribution nodes 16. The aircraft 10 can further include a set of supplemental power sources 24 selectably connected with the power transmission lines 33, and operable to provide supplemental power, redundant power, backup power, emergency power, or the like. Non-limiting examples of the supplemental power sources 24 can include, but are not limited to, generators, such as auxiliary or emergency power generators, solar panels, fuel cells, batteries, or any other source of electrical power. As shown, the set of supplemental power sources 24 can provide power to the set of power transmission lines 33, and thus, the set of power distribution nodes 16 or the set of electrical loads 30.

In the aircraft 10, the operating left and right propulsion engines 17 provide mechanical energy which can be extracted, typically via a spool, to provide a driving force for the set of generators 18. The set of generators 18, in turn, generate power, such as alternating current (AC) or direct current (DC) power, and provides the generated power to the power transmission lines 33, which delivers the power to the set of electrical loads 30, positioned throughout the aircraft 10. Furthermore, during operation, the set of supplemental power sources 24 can be selectively coupled to the power transmission lines 33, and operable to provide supplemental power to the set of electrical loads 30.

Figure 2:
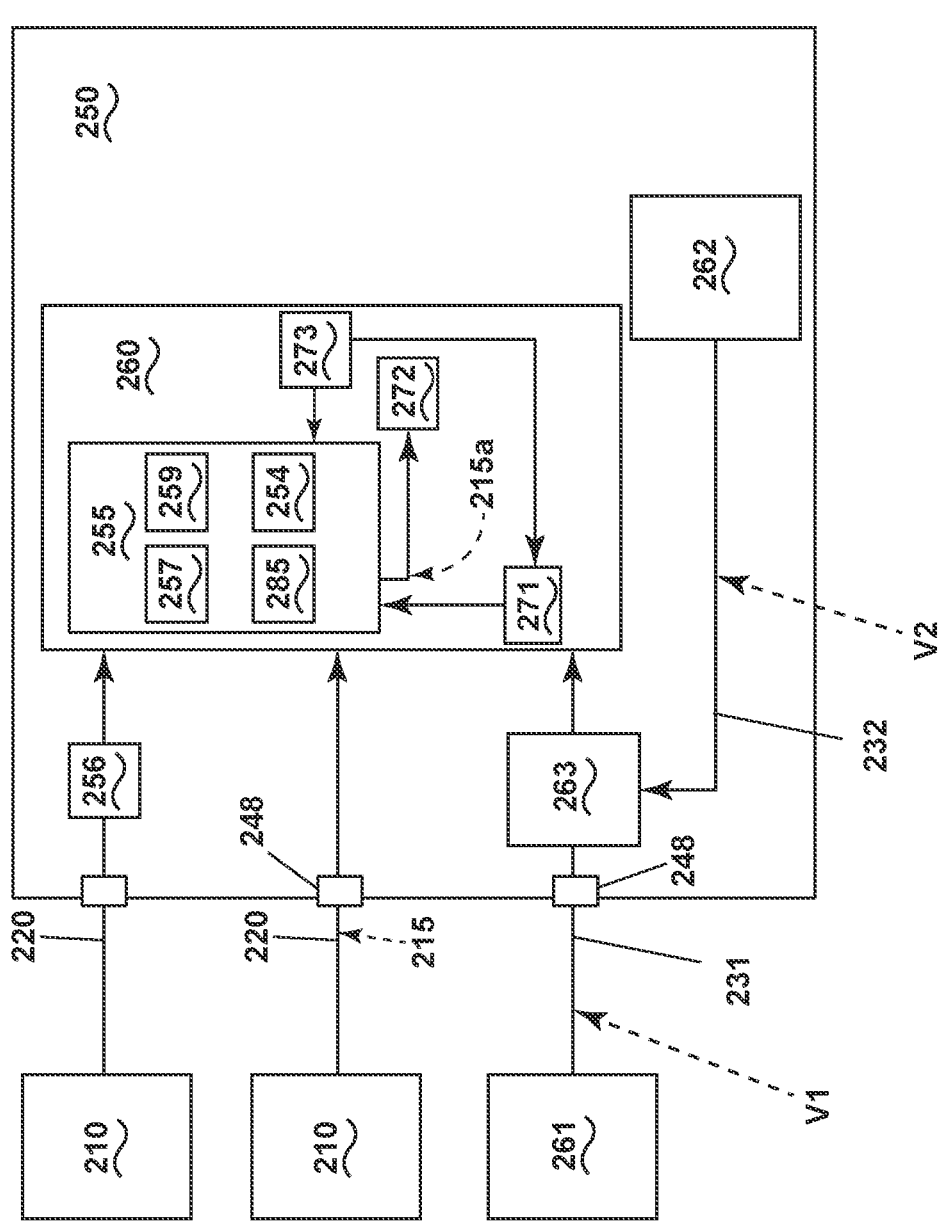
FIG. 2 is a block diagram of an example cockpit voice and flight data recorder system that can be utilized with the aircraft and ground system of FIG. 1, in accordance with aspects described herein.

FIG. 2 illustrates a functional block diagram of a non-limiting aspect of a CVFDR system 200 for use with the aircraft 10 of FIG. 1. The CVFDR system 200 can include a CVFDR 250. communicatively couplable via a data communication network 220 of the aircraft 10 to a set of FRMs 210. The CVFDR 250 is coupled to an external or remote first power source 261, such as the power system 11 (shown in FIG. 1), the generators 18, the supplemental power sources 24 or combinations thereof, via a respective first transmission line 231.

The CVFDR 250 includes a control module 260 having a processor 255, a first memory 271, a second memory 272, an internal or local second power source 262, and a set of input and output (I/O) ports 248. In non-limiting aspects the control module 260 can include a third memory 273. In non-limiting aspects, the CVFDR 250 can also include a power controller 263 coupled to the first power source 261 and the second power source 262.

The processor 255 may also contain memory, peripheral interfaces, and other integrated components and can comprise a microcontroller or system on chip (SoC). In non-limiting aspects, the processor 255 can include one or more central processing units (CPUs) 259 (e.g., processor cores). It will be appreciated that in various non-limiting aspects, the CVFDR 250 or the processor 255, or both, can include additional elements or modules as desired to perform various known functionalities associated with the CVFDR 250. For example, in non-limiting aspects, the processor 255 can include one or more coder/decoder (codec) modules 256, (e.g., a sound card) communicatively coupled to a respective FRM 210 to receive an audio data signal 215 via the data communication network 220. In other aspects, the processor 255 can include one or more dedicated analog-to-digital converters (ADCs) 254 communicatively coupled to a respective FRM 210 to receive an audio data signal 215 via the data communication network 220.

In various non-limiting aspects, the CVFDR 250 or the processor 255, or both, can include one or more integrated peripheral controllers 257. For example, in non-limiting aspects, the one or more integrated peripheral controller 257 can include, without limitation, a memory controller (e.g., a synchronous dynamic random-access memory (SDRAM) controller), a communications interface controller (e.g., a PCI-e controller or an ethernet controller), a communication transceiver (e.g., an ARINC 429 driver (transmitter)).

The set of I/O ports 248 can be communicatively coupled to the data communication network 220. In non-limiting aspects, one or more of the I/O ports 248 can comprise a memory-mapped I/O port 248. In non-limiting aspects, one or more of the I/O ports 248 can be associated with or dedicated to a set of channels. For example, in some aspects, particular I/O port 248 can be associated with or dedicated to the receipt of a respective data signal 215 from an FRM 210.

In non-limiting aspects, CVFDR 250 can be communicatively coupled to the set of FRMs 210 via the data communication network 220. In non-limiting aspects, the data communications network 220 can comprise a data communications network of the CVFDR system 200. In other aspects, the data communications network 220 can additionally, or alternatively, comprise the data communications network of the aircraft 10 (FIG. 1).

The FRMs 210 can be configured as a set of fixed aircraft components, such as a set of LRUs. For example, in non-limiting aspects, the FRMs 210 can be configured to receive and processes audio or other flight data from various data sources such as sensors, monitors, instruments, and the like. In some aspects, the set of FRMs 210 can include by way of non-limiting examples, a cockpit voice recorder module, a flight data recorder module, a cockpit area microphone, an aircraft intercom system and combinations thereof. Each FRM 210 can include a respective transducer or sensor (not shown) to measure, detect, or otherwise sense a predetermined parameter. Each FRM 210 is arranged to provide a respective data signal 215 indicative of the measured or sensed parameters (e.g., sound). It is contemplated that in other aspects, the set of FRMs 210 can optionally include any number of other FRMs (not shown) directed to data collection and recording of other desired aircraft performance and operational data. It will be appreciated that, in non-limiting aspects, the set of FRMs 210 can comprise individual LRUs. In other aspects the set of FRMs 210 can be combined into fewer physical entities, for example by combining the respective functions of two or more FRMs 210 onto one or more circuit card assemblies (not shown). The set of FRMs 210 can be communicatively coupled to the CVFDR 250 via the data communication network 220 to provide a respective data signal 215 including data indicative of sensed or measured parameter.

In non-limiting aspects, the data communication network 220 can define a network mesh or switch fabric comprising a set of communicatively coupled network switches or bridges (not shown) such as Ethernet switches. In other non-limiting aspects, the data communication network 220 can be configured in accordance with TSN schema, or a TTE schema, to communicate data using standard methods for time synchronization and traffic management, allowing deterministic communication over a standard Ethernet network. It is contemplated that the data communication network 220 can comprise any desired schema, communication bus, or bus topology that would enable aspects to operate as described herein without departing from the scope of the disclosure. For example, in non-limiting aspects, the data communication network 220 can comprise a high-speed serial bus compliant with a PCIe schema. In such non-limiting aspects having a PCIe compliant point-to-point topology, the set of separate respective communication links (not shown) can communicatively couple each FRM 210 to the data communication network 220 to enable full-duplex communication of data packets between any two end nodes (e.g., the FRM 210 or CVFDR 250), with no inherent limitation on concurrent access between multiple end nodes. In non-limiting aspects, the set of communication links can communicatively couple one or more FRM 210 to the CVFDR 250, the data communication network 220, a data bus (not shown) of the aircraft, various data acquisition devices (not shown) of the aircraft, or any combination thereof. The set of communication links can comprise any one or more of serial links, parallel data bus links, or other conventional communication links (not shown).

The first power source 261 can be remote from the CVFDR 250. For example, the first power source 261 can include the power system 11 of the aircraft 10 (shown in FIG. 1). In non-limiting aspects, the first power source 261 can include the one or more generators 18 (FIG. 1) or back-up power sources (not shown) configured to provide a first voltage V1 to the control module 260. It is contemplated that the first power source 261 acts as a primary power source for the CVFDR 250.

The second power source 262 can be local to the CVFDR 250. That is, the second power source 262 can be embodied as a structural element or component forming the CVFDR 250. The second power source 262 can include an electronic storage device such as a capacitor or supercapacitor. Alternatively, in non-limiting aspects, the second power source 262 can include a chemical-energy storage (e.g., a battery or supersaturated salt solution). As will be described in more detail herein, the second power source 262 is sized and configured to provide a second voltage V2 to the control module 260 via a second transmission line 232. The second voltage V2 can be based on at least a minimum predetermined voltage value or level $V2_{min}$ (not shown) necessary to operate the CVFDR 250 in the absence (e.g., an interruption) of the first voltage V1. In this sense, the second power source 262 can be considered a secondary or temporary power source.

The power controller 263 can be coupled to the first power source 261 to receive the first voltage V1 therefrom, and further coupled to the second power source 262 to receive the second power second voltage V2 therefrom. The first voltage V1 and second voltage V2 can have the same value (e.g., 28 volts). In some aspects, the first voltage V1 and second voltage V2 can have different values. For example, it will be appreciated, as described herein, that the second voltage V2 can decay from an initial value over time. The power controller 263 can include various internal components such as, but not limited to, resistors, diodes, voltage sensors, transformers, grounds, and switching elements arranged to selectively or switchably provide the first voltage V1 or the second voltage V2 to the control module 260. In some non-limiting aspects, the power controller 263 can include a buck circuit, boost circuit, or both (not shown).

The processor 255 can be configured to run any suitable programs or program code 285 to enable aspects to operate as described herein. While not shown, it will be understood that each control module 260 can include or be associated with any suitable number of individual microprocessors, power supplies, storage devices, interface cards, control modules, and other standard components and that the respective control module 260 can include or cooperate with machine executable code, any number of software programs (e.g., data recording programs), or other instructions designed to carry out the various methods, process tasks, calculations, and control/display functions necessary for the intended operation of the respective CVFDR 250. The control module 260 can include any known processor, microcontroller, or logic device, including, but not limited to: Field Programmable Gate Arrays (FPGA), a Complex Programmable Logic Device (CPLD), an Application-Specific Integrated Circuit (ASIC), a Full Authority Digital Engine Control (FADEC), a Proportional Controller (P), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof.

The first memory 271 can include a data storage component accessible by the processor 255, including program code 285. In one example, the program code 285 can be stored within the first memory 271 in a machine-readable format accessible by the processor 255. In non-limiting aspects, the first memory 271 can additionally store various data, data types, sensed or measured data values, inputs, generated or processed data, local variables, or the like, accessible by the processor in providing instruction, control, as necessary to execute the program code 285, as described herein. The first memory 271 can comprise a system memory of the control module 260. In non-limiting aspects, the first memory 271, can be volatile or non-transient, or non-volatile memory. Additional non-limiting examples of the first memory 271 can include Random Access Memory (RAM), Read-Only Memory (ROM), flash memory, or one or more different types of portable electronic memory, or combinations thereof. For example, in one particular non-limiting aspect the first memory 271 can comprise an SDRAM used to store program code 285 executed by the processor 255.

The second memory 272 can include a data storage component accessible by the processor 255. In non-limiting aspects, the second memory 272 can additionally store various data, data types, sensed or measured data values, inputs, generated or processed data, or the like, received from the processor 255. In non-limiting aspects, the second memory 272, can be volatile or non-transient, or non-volatile memory. Additional non-limiting examples of the second memory 272 can include Random Access Memory (RAM), Read-Only Memory (ROM), flash memory, or one or more different types of portable electronic memory, or combinations thereof. For example, in one particular non-limiting aspect, the second memory 272 can comprise a non-volatile static random-access memory (NVSRAM) used to store data received by the processor 255 from one or more FRMs 210. In other non-limiting aspects, the second memory 272 can comprise any other type of memory including, without limitation, an embedded Multi-Media Card (eMMC) including both NAND flash memory and a flash memory controller, or a solid-state drive (SSD) including non-volatile, persistent data storage system on solid-state, NAND flash memory SSD or non-volatile program memory (e.g., NOR flash) without departing from the scope of the disclosure.

In non-limiting aspects, the third memory 273 can be communicatively coupled to the first memory 271, or the processor 255, or both. The third memory 273 can include a data storage component accessible by the processor 255, including program code 285. In one example, the program code 285 can be stored within the third memory 273 in a machine-readable format accessible by the processor 255, or the first memory 271 or both. In non-limiting aspects, the third memory 273 can additionally store various data, data types, sensed or measured data values, inputs, generated or processed data, local variables, or the like, accessible by the processor in providing instruction, control, as necessary to execute the program code 285, as described herein. In non-limiting aspects, the third memory 273, can be non-transient, or non-volatile memory. Additional non-limiting examples of the third memory 273 can comprise any other type of memory including, without limitation, an embedded Multi-Media Card (eMMC) including both NAND flash memory and a flash memory controller, or a solid-state drive (SSD) including non-volatile, persistent data storage system on solid-state, NAND flash memory SSD, non-volatile program memory (e.g., NOR flash), or combinations thereof, without departing from the scope of the disclosure. For example, in one particular non-limiting aspect, the third memory 273 can comprise NOR Flash memory used to store program code 285 that is uploaded to the second memory 272 to be read and executed by the processor 255.

In operation, the CVFDR 250 can receive the first voltage V1 from the first power source 261 (e.g., the power system 11, shown in FIG. 1) via the first transmission line 231. For example, the first power source 261 can provide the first voltage V1 from the one or more generators 18 (FIG. 1) or back-up power sources (not shown) to the power controller 263. The first voltage V1 can be any desired value (for example, 28 volts DC). It is contemplated that the first power source 261 acts as a primary power source for the CVFDR 250. In non-limiting aspects, the power controller 263 can receive the first voltage V1. In non-limiting aspects, the power controller 263 can step-up, step-down, or otherwise modify the value of the first voltage V1 to another predetermined value in a known manner. The first voltage V1 can be an operating power for the CVFDR 250. During a start-up mode or initial operation phase of the CVFDR 250, the control module 260 can be energized based on the first voltage V1 and can boot up or otherwise operate in a start-up mode of operation by accessing program code 285 stored in the first memory 271. The program code 285 can comprise instructions, that when executed, cause the processor 255 to transition to and operate in a normal mode of operation. As will be described in more detail herein, with simultaneous reference to FIGS. 2 and 3, the program code 285 can further include additional instructions, that when executed, cause the processor 255 to selectively transition between operation in a normal mode and operation in an economy mode.

In non-limiting aspects, in the normal mode of operation, each FRM 210 of the set of FRMs 210 can provide or transmit a respective data signal 215 indicative of the respective sensed or measured parameters (e.g., temperature, altitude, and the like) to the CVFDR 250 via the data communication network 220, in accordance with known protocols (e.g., in accordance with TSN or TTE schema). The CVFDR 250 can receive the data signal 215 including data 215a indicative of operational data such as the respective sensed or measured parameter (e.g., a temperature), at a respective I/O port 248. In non-limiting aspects the data signal 215 can be a data stream or data flow. The processor 255 can be configured to transmit the data 215a indicative of the sensed or measured parameter to the second memory 272 to be saved or written to the second memory 272. The processor 255 can continuously, periodically, or intermittently provide a transmission of the data 215*a* to the second memory 272.

In non-limiting aspects, the normal mode of operation can additionally comprise providing power (e.g., the first voltage V1) to the second memory 272 from the power controller 263. Additionally, or alternatively, in non-limiting aspects, the normal mode of operation can include providing power to the first memory 271 from the power controller 263. Furthermore, in non-limiting aspects, the normal mode of operation can include providing power from the power controller 263 to one or more CPUs 259 of the processor 255 or one or more integrated peripheral controllers 257 within the processor 255, or both. In other non-limiting aspects, the normal mode of operation can include providing power from the power controller 263 to the one or more codecs 256 or one or more ADCs 254, or both.

In the event of an interruption of the first voltage V1, the power controller 263 is configured to switchably or selectively provide the second voltage V2 to the control module 260. In non-limiting aspects, the interruption of the first voltage V1 can include a degradation or reduction of the first voltage V1 below a predetermined value or range. Additionally, in some non-limiting aspects, the interruption of the first voltage V1 can be defined by an absence, or reduction, of the first voltage V1 for a predetermined minimum time period (e.g., 8.3 milliseconds).

Figure 3A:
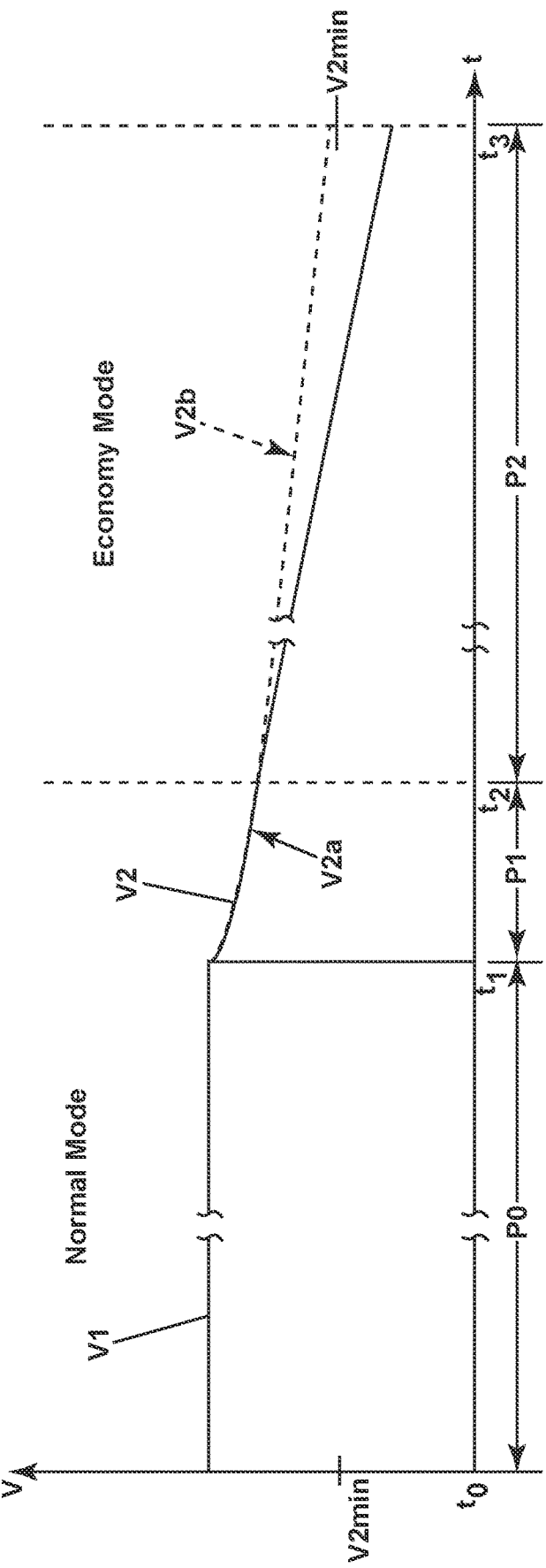
FIG. 3A is a graph depicting an example of an operation of a control module of a cockpit voice and flight data recorder system in accordance with aspects described herein.

FIG. 3A depicts a graph in illustrating an example of an operation of a non-limiting aspect of a CVFDR system, as described herein. As shown, during a normal mode of operation of the control module 260, the first voltage V1 (e.g., 28 volts) can be provided (e.g., from the power controller 263 to the control module 260) over a particular period P0. beginning at $t_0$ (on the t-axis). The first voltage V1 is provided over the period P0 from $t_0$ to $t_1$ (on the t-axis) during the normal mode of operation of the control module 260. It is contemplated that the particular period P0 can have any time duration, and $t_1$ can be any particular time without departing from the scope of the disclosure herein. In certain instances, the first voltage V1 from the first power source 261 can be interrupted, for example due to an equipment malfunction. As depicted in FIG. 3A, the interruption of the first voltage V1 can cause the first voltage V1 to drop to zero volts (e.g., at $t_1$). In other instances, the interruption of the first voltage V1 can cause the first voltage to drop or decay below a predetermined threshold voltage level (not shown). For example, in non-limiting aspects, the predetermined threshold voltage level can be defined as a percentage (e.g., 80%) of the first voltage V1. In other non-limiting aspects, the predetermined threshold voltage level can be any desired voltage value that is less than the first voltage V1. The interruption of the first voltage V1 defines an end of the particular period P0 at $t_1$. In the event of an interruption (e.g., an unplanned interruption) of the first voltage V1 the power controller 263 ceases providing the first voltage V1 to the control module 260, and then provides the second voltage V2 at an initial value (e.g., 28 volts) from the second power source 262 to the control module 260 as shown beginning at $t_1$ on the t-axis. As illustrated, the second voltage V2 can decay from the initial value over time. For example, the second voltage V2 can decay at a first rate of decay V2*a* (illustrated as a solid line having a negative slope) of the second voltage V2. The first rate of decay V2*a* (e.g., a rate of capacitor discharge) is determined based on the particular electrical load or resistance provided by the CVFDR. The second power source 262 (e.g., a capacitor) can provide the second voltage V2 to the power controller

263 for a first predetermined period P1 (i.e., from $t_1$ to $t_2$) while the control module 260 continues operating in the normal mode operation. In non-limiting aspects, the first predetermined period P1 can be a period of time. For example, in one non-limiting aspect, the first predetermined period P1 can be 200 milliseconds. In some non-limiting aspects, the first predetermined period P1 can be based on the first rate of decay V2*a* of the second voltage V2. In still other non-limiting aspects, the first predetermined period P1 can be based on a threshold, such as a voltage threshold.

At a conclusion of the first predetermined period P1, (e.g., at $t_2$ on the t-axis) the second power source 262 can continue to provide the second voltage for a subsequent second predetermined period P2 (e.g., from $t_2$ to $t_3$). For example, in one non-limiting instance, the second predetermined period P2 can be 2 seconds. However, at the start of the second predetermined period P2, the control module 260 is configured to transition from the normal mode of operation to operate in the economy mode of operation. For example, in non-limiting aspects, a transition from the normal mode of operation to the economy mode of operation can be triggered by a clock signal (not shown) from the processor 255.

In non-limiting aspects, the economy mode of operation can include suspending, by the processor 255, reception of the data 215*a* from the FRMs 210 for a second predetermined period P2 (e.g., from $t_2$ to $t_3$, on the t-axis). It will be appreciated that suspending the reception of the data 215*a* by the processor 255 can further include suspending by the processor 255 the transmission of the data 215*a* to the second memory 272.

The economy mode of operation can additionally or alternatively comprise placing the second memory 272 into a sleep mode (e.g., an eMMC or SSD or non-volatile program memory such as a NOR flash memory).

Additionally, or alternatively, in non-limiting aspects, the economy mode of operation can include placing the first memory 271 (e.g., an SDRAM) in a low-power or self-refresh mode for the second period P2. Furthermore, in non-limiting aspects, the economy mode of operation can include turning off or ceasing providing power to one or more CPUs 259 or processor cores of the processor 255 for the second predetermined period P2. In other non-limiting aspects, the economy mode of operation can include turning off or ceasing providing power to one or more integrated peripheral controllers 257 within the processor 255 for the second predetermined period P2. In still other non-limiting aspects, the economy mode of operation can include turning off or ceasing providing power to one or more codecs 256 of the CVFDR 250 for the second predetermined period P2. In other non-limiting aspects, the economy mode of operation can include turning off or ceasing providing power to one or more ADCs 254 of the CVFDR 250 for the second predetermined period P2.

It will be appreciated that the suspending the reception of the data 215*a* by the processor 255, or the placing the second memory 272 (e.g., an SDRAM memory) into a self-refresh mode, or the placing the second memory 272 into a sleep mode, or the ceasing providing power to one or more CPUs 259, one or more integrated peripheral controllers 257, one or more codecs 256, one or more ADCs 254, or combinations thereof, power demanded by the processor 255, the control module 260, the CVFDR 250, or combinations thereof, while operating in the economy mode of operation will be reduced, relative to electrical power ordinarily consumed by the processor 255 during the normal mode of operation. It will be further appreciated that when the power consumed by the processor 255 is reduced during the economy mode of operation, the second voltage V2 provided by the second power source 262 will decay at a second rate of decay V2$b$ (illustrated as a dashed line having a negative slope) that is reduced or more gradual relative to the first rate of decay V2$a$ of the second voltage V2 previously exhibited under the normal mode of operation.

In non-limiting aspects, the second predetermined period P2 can be a second predetermined period of time. For example, in one non-limiting aspect, the second predetermined period P2 can be 2 seconds. In non-limiting aspects, the duration of second predetermined period P2 can be based on a second rate of decay V2$b$ (e.g., 5 volts per second) of the second voltage V2, or the predetermined minimum voltage level V2$_{min}$ (e.g., 18 volts) necessary to operate the CVFDR 250 or a combination thereof.

It will be appreciated, that by suspending the receipt of the data 215$a$ from the FRMs 210, during the economy mode of operation, electrical power demanded or consumed by the processor 255 will be reduced relative to electrical power ordinarily consumed by the processor 255 during the normal mode of operation. It will be further appreciated that when the power consumed by the processor 255 is reduced during the economy mode of operation, the second voltage V2 provided by the second power source 262 will decay at a second rate of decay V2$b$ (illustrated as a dashed line having a negative slope) that is reduced or more gradual relative to the first rate of decay V2$a$ of the second voltage V2 previously exhibited under the normal mode of operation. Accordingly, based on the operation of the control module 260 in the economy mode, the second voltage V2 can be maintained above the minimum predetermined voltage value V2$_{min}$ for a longer duration than it would otherwise be if the control module 260 continued in the normal mode of operation. In this way, aspects as disclosed herein enable use of a smaller, lighter, and less expensive second power source 262 than would be needed in conventional devices to meet requirements to provide the second voltage V2 at the minimum predetermined voltage value V2$_{min}$, for the second predetermined period P2 (e.g., 2 seconds).

Figure 3B:
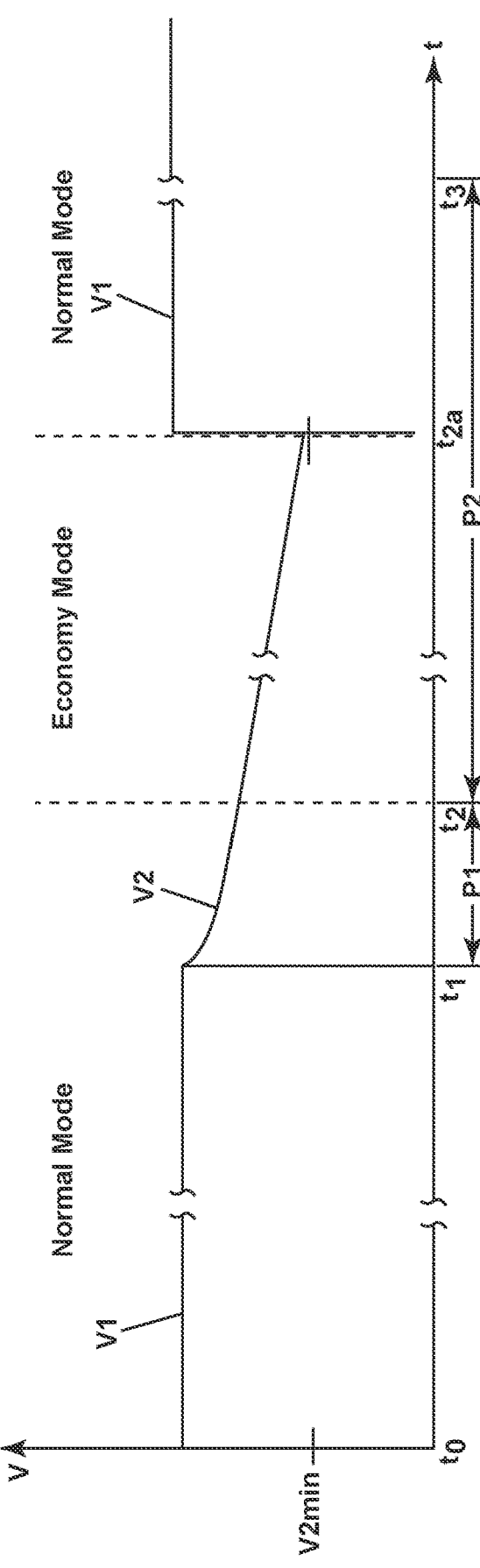

It will be appreciated, that in operation, in some instances, the first voltage V1 can be restored prior to the expiration of the second period P2. FIG. 3B depicts a graph illustrating another example of an operation of a non-limiting aspect of a CVFDR system including a CVFDR as described herein. In this instance, similar to the example depicted in FIG. 3A, the first voltage V1 is provided over the time period P0, (i.e., from $t_0$ to $t_1$) in accordance with the normal mode of operation of the control module 260. Also similar to the instance depicted in FIG. 3A, in response to an interruption of the first voltage V1, the power controller 263 ceases providing the first voltage V1 to the control module 260, and then provides the second voltage V2 from the second power source 262 to the control module 260 for a first predetermined period P1 (e.g., for 200 milliseconds beginning at $t_1$) while the control module 260 continues operating in the normal mode of operation. Additionally, at the conclusion of the first predetermined period, (e.g., at $t_2$) the control module 260 transitions from the normal mode of operation to the economy mode of operation for the second predetermined period P2 (e.g., 2 seconds), while the second power source 262 continues to provide the second voltage V2. However, in the non-limiting aspect depicted in FIG. 3B, the first voltage V1 is restored prior to the expiration or completion of the second period P2 (e.g., at $t_{2a}$). In response to such a subsequent restoration of the first voltage V1 received from the first power source 261 during or within the second predetermined period P2 (e.g., within 2 seconds), the power controller 263 ceases providing the second voltage V2 from the second power source 262, to then provide the first voltage V1 from the first power source 261 to the control module 260. Based on the transition from the second voltage V2 to the first voltage V1, the control module 260 can transition from the economy mode of operation to the normal mode of operation. For example, in non-limiting aspects, a transition from the economy mode of operation to the normal mode of operation can be triggered by a clock signal (not shown) from the processor 255.

In non-limiting aspects, the normal mode of operation can include executing, by the processor 255, the operating code stored in the first memory 271 (e.g., system memory). The operating in accordance with the normal mode of operation can also include resuming receipt of data 215$a$ from the set of FRMs 210 and the transmission of the received data 215$a$ to the second memory 272. The operating in accordance with the normal mode of operation can include terminating the self-refresh mode of the first memory 271, and resuming normal refresh of the first memory 271 by the processor 255. Furthermore, in non-limiting aspects, the normal mode of operation can include resuming providing power to one or more CPUs 259 or integrated peripheral controllers 257 within the processor 255. In other non-limiting aspects, the normal mode of operation can include resuming providing power to one or more codecs 256 of the CVFDR 250. In other non-limiting aspects, the normal mode of operation can include resuming providing power to one or more ADCs 254 of the CVFDR 250.

FIG. 4 illustrates a non-limiting example of a method 400 of operating the CVFDR system 200 of an aircraft 10. The method 400 can be performed while the aircraft 10 is in-flight, pre-flight (e.g., prior to executing a flight plan), or post-flight (e.g., subsequent to a flight). Although described in terms of a CVFDR system 200, it will be appreciated that the method 400 can be applied to any suitable avionics device configured to sample data and transmit the data to any other suitable other avionics device. While the method 400 will be described herein, for ease of understanding, in terms of the CVFDR system 200 of FIG. 2, other aspects are not so limited and method 400 can be implemented with any desired CVFDR system without departing from the scope of the disclosure.

The CVFDR system 200 can include the CVFDR 250 and the set of FRMs 210. The CVFDR 250 can be coupled to the set of FRMs 210 via a data communication network 220. In non-limiting aspects, the data communications network 220 can comprise the data communications network of the CVFDR system 200. In other aspects, the data communications network 220 can additionally, or alternatively, comprise the data communications network of the aircraft 10. The set of FRMs 210 can include by way of non-limiting examples, a cockpit voice recorder module, a flight data recorder module, a cockpit area microphone, an aircraft intercom system and combinations thereof. Each FRM 210 can include a respective transducer or sensor (not shown) to measure, detect, or otherwise sense a predetermined parameter. The sensor can provide a respective data signal 215 indicative of the measured or sensed parameters (e.g., sound) from the FRM 210 to the CVFDR 250.

The CVFDR 250 can include the control module 260 having the processor 255, the first memory 271, the second memory 272, the internal second power source 262, and the set of I/O ports 248. In non-limiting aspects, the control module 260 can include a third memory 273. The CVFDR 250 can include a power controller 263 coupled to the first power source 261 and the second power source 262. The control module 260 can be communicatively coupled to the first memory 271 to receive program code 285 therefrom, and further communicatively coupled to the second memory 272, to transmit data 215a received from the FRMs 210 thereto. The control module can be coupled to the remote first power source 261 to receive the first voltage V1 therefrom, and coupled to the local second power source 262 to receive the second voltage V2. The first memory 271 can include a data storage component accessible by the processor 255, including program code 285. The program code 285 can be stored within the first memory 271 in a machine-readable format accessible by the processor 255.

In non-limiting aspects, the first memory 271 can additionally store various data, data types, sensed or measured data values, inputs, generated or processed data, local variables, or the like, accessible by the processor in providing instruction, control, as necessary to execute the program code 285, as described herein. The first memory 271 can comprise a system memory of the control module 260. In non-limiting aspects, the first memory 271, can be volatile or non-transient, or non-volatile memory. Additional non-limiting examples of the first memory 271 can include Random Access Memory (RAM), Read-Only Memory (ROM), flash memory, or one or more different types of portable electronic memory, or combinations thereof. For example, in one particular non-limiting aspect the first memory 271 can comprise a synchronous dynamic random-access memory (SDRAM) used to store program code 285 executed by the processor 255.

The second memory 272 can include a data storage component accessible by the processor 255. In non-limiting aspects, the second memory 272 can additionally store various data, data types, sensed or measured data values, inputs, generated or processed data, or the like, received from the processor 255. In non-limiting aspects, the second memory 272, can be volatile or non-transient, or non-volatile memory. Additional non-limiting examples of the second memory 272 can include Random Access Memory (RAM), Read-Only Memory (ROM), NOR flash memory, or one or more different types of portable electronic memory, or combinations thereof. For example, in one particular non-limiting aspect, the second memory 272 can comprise a non-volatile static random-access memory (NVSRAM) used to store data received by the processor 255 from one or more FRMs 210. In other non-limiting aspects, the second memory 272 can comprise any other type of memory including, without limitation, an embedded Multi-Media Card (eMMC) including both NAND flash memory and a flash memory controller, or a solid-state drive (SSD) including non-volatile, persistent data storage system on solid-state, NAND flash memory SSD or non-volatile program memory (e.g., NOR flash) without departing from the scope of the disclosure.

In non-limiting aspects, the third memory 273 can be communicatively coupled to the first memory 271, or the processor 255, or both. The third memory 273 can include a data storage component accessible by the processor 255, including program code 285. In one example, the program code 285 can be stored within the third memory 273 in a machine-readable format accessible by the processor 255, or the first memory 271 or both. In non-limiting aspects, the third memory 273 can additionally store various data, data types, sensed or measured data values, inputs, generated or processed data, local variables, or the like, accessible by the processor in providing instruction, control, as necessary to execute the program code 285, as described herein. In non-limiting aspects, the third memory 273, can be non-transient, or non-volatile memory. Additional non-limiting examples of the third memory 273 can comprise any other type of memory including, without limitation, an embedded Multi-Media Card (eMMC) including both NAND flash memory and a flash memory controller, or a solid-state drive (SSD) including non-volatile, persistent data storage system on solid-state, NAND flash memory SSD, non-volatile program memory (e.g., NOR flash), or combinations thereof, without departing from the scope of the disclosure. For example, in one particular non-limiting aspect, the third memory 273 can comprise NOR Flash memory used to store program code 285 that is uploaded to the first memory 271 to be read and executed by the processor 255.

The method 400 can include, at 410, receiving, by the control module 260, the first voltage V1. For example, the control module 260 can receive the first voltage V1 from the first power source 261 (e.g., the power system 11, shown in FIG. 1) via the first transmission line 231. The first power source 261 can provide the first voltage V1 from the one or more generators 18 (FIG. 1) or back-up power sources (not shown) to the power controller 263. The first voltage V1 can be any desired value (for example, 28 volts DC). In non-limiting aspects, the first power source 261 acts as a primary power source for the CVFDR 250. In non-limiting aspects, the power controller 263 can receive the first voltage V1. In non-limiting aspects, the power controller 263 can step-up, step-down, or otherwise modify the value of the first voltage V1 to another predetermined value. The first voltage V1 can be an operating power for the CVFDR 250.

During a start-up mode or initial operation phase of the CVFDR 250, the control module 260 can be energized based on the first voltage V1 and can boot up or otherwise operate in a start-up mode of operation by accessing program code 285 stored in the first memory 271. The method 400 can include at 415, receiving by the processor 255 the program code 285 from the first memory 271. The first memory 271 can include a data storage component accessible by the processor 255, including program code 285. The program code 285 can be stored within the first memory 271 in a machine-readable format accessible by the processor 255. The program code 285 can comprise instructions, that when executed, cause the controller 260 to selectively transition to and operate in a normal mode of operation. In non-limiting aspects, the operating the controller 260 in the normal mode of operation can comprise providing power (e.g., the first voltage V1) to the second memory 272 from the power controller 263. Additionally, or alternatively, in non-limiting aspects, the normal mode of operation can include providing power to the first memory 271 from the power controller 263. Furthermore, in non-limiting aspects, the normal mode of operation can include providing power from the power controller 263 to one or more CPUs 259 of the processor 255 or one or more integrated peripheral controllers 257 within the processor 255, or both. In other non-limiting aspects, the normal mode of operation can include providing power from the power controller 263 to the one or more codecs 256 or one or more ADCs 254, or both.

The program code 285 can further include additional instructions, that when executed, cause the processor 255 to selectively transition to and operate in an economy mode of operation or a normal mode of operation.

The method 400 includes, at 420, operating the control module 260 in the normal mode of operation. The operating the control module 260 in the normal mode of operation can include, at 425 executing the program code 285 received from the first memory 271, and at 430, receiving by the control module 260, data 215a from the data communication network 220. In non-limiting aspects, the data 215*a* can be provided by the set of FRMs 210. The data 215*a* can be embodied in respective data signal 215 indicative of the respective sensed or measured parameters. The data signal 215 can be transmitted to the CVFDR 250 via the data communication network 220, in accordance with known protocols (e.g., in accordance with TSN or TTE schema). In non-limiting aspects the data signal can be a data stream or data flow.

In non-limiting aspects, the receiving data 215*a* by the control module 260 from the data communication network 220 can include transmitting the received data 215*a* by the control module 260 to the second memory 272. For example, the processor 255 can be configured to transmit the data 215*a* indicative of the sensed or measured parameter to the second memory 272 to be saved or written to the second memory 272. The processor 255 can continuously, periodically, or intermittently provide a transmission of the data 215*a* to the second memory 272. In one particular non-limiting aspect, the second memory 272 can comprise a non-volatile static random-access memory (NVSRAM) used to store data received by the processor 255 from one or more FRMs 210.

Based on an interruption of the first voltage V1, the method 400 includes, at 435, providing the second voltage V2 (e.g., 28 volts) to the control module 260. The second voltage V2 can be provided for the first predetermined period P1 while the control module 260 continues operating in the normal mode of operation. In non-limiting aspects, the first predetermined period P1 can be a period of time. For example, in one non-limiting aspect, the first predetermined period P1 can be 200 milliseconds. The second voltage V2 can decay at the first rate of decay V2*a*. The first rate of decay V2*a* can be a rate of capacitor discharge determined based on the particular electrical load or resistance provided by the CVFDR. In some non-limiting aspects, the first predetermined period P1 can be based on the first rate of decay V2*a* of the second voltage V2 (e.g., 5 volts per second).

The method 400 further includes, at 440, operating the control module 260 in an economy mode of operation for the second predetermined period P2. The second voltage V2 can continue to be provided to the control module 260 for at least a portion (e.g., 1.5 seconds) of the second predetermined period P2. The economy mode of operation can include, at 445, suspending, by the processor 255, reception of the data 215*a* from the data communication network 220 for a second predetermined period P2. Suspending the reception of the data 215*a* by the processor 255 can further include suspending, by the processor 255, the transmission of the data 215*a* to the second memory 272.

The economy mode of operation can additionally or alternatively comprise placing the second memory 272 into a sleep or suspend mode, such as by providing reduced power to the second memory 272 (e.g., RAM) only to retain its data. Additionally, or alternatively, in non-limiting aspects, the economy mode of operation can include placing the first memory 271 (e.g., an SDRAM) in a low-power or self-refresh mode for the second period P2. Furthermore, in non-limiting aspects, the economy mode of operation can include turning off or ceasing providing power to one or more CPUs 259 or processor cores of the processor 255 for the second predetermined period P2. In other non-limiting aspects, the economy mode of operation can include turning off or ceasing providing power to one or more integrated peripheral controllers 257 within the processor 255 for the second predetermined period P2. In still other non-limiting aspects, the economy mode of operation can include turning off or ceasing providing power to one or more codecs 256 of the CVFDR 250 for the second predetermined period P2. In other non-limiting aspects, the economy mode of operation can include turning off or ceasing providing power to one or more ADCs 254 of the CVFDR 250 for the second predetermined period P2.

In non-limiting aspects, in response to a restoration of the first voltage V1 during the second predetermined period P2, the method 400 can further comprise at 450, receiving, by the control module 260, the first voltage V1. Based on the transition from the second voltage V2 to the first voltage V1, the method 400 can further include returning to or resuming the operating the control module 260 in the normal mode of operation, at 420. For example, in non-limiting aspects, a transition from the economy mode of operation to the normal mode of operation can be triggered by a clock signal (not shown) from the processor 255.

In non-limiting aspects, the normal mode of operation can include operating the processor 255 by executing the operating code received from the first memory 271 (e.g., system memory). The operating in accordance with the normal mode of operation can also include at 430, resuming receipt of data 215*a* from the data communication network 220. The operating in accordance with the normal mode of operation can also include terminating the self-refresh mode of the first memory 271, and resuming normal refresh of the first memory 271 by the processor 255. Furthermore, in non-limiting aspects, the normal mode of operation can include resuming providing power to one or more CPUs 259 or integrated peripheral controllers 257 within the processor 255. In other non-limiting aspects, the normal mode of operation can include resuming providing power to one or more codecs 256 of the CVFDR 250. In other non-limiting aspects, the normal mode of operation can include resuming providing power to one or more ADCs 254 of the CVFDR 250.

The sequences depicted are for illustrative purposes only and is not meant to limit the method 400 in any way as it is understood that the portions of the method can proceed in a different logical order, additional or intervening portions can be included, or described portions of the method can be divided into multiple portions, or described portions of the methods can be omitted without detracting from the described method. For example, the method 400 can include various other intervening steps. The examples provided herein are meant to be non-limiting.

It is contemplated that aspects of this disclosure can be advantageous for use over conventional systems or methods for configuring and operating a CVFDR. Aspects of this disclosure enable the use of smaller, lighter, and less expensive capacitors or batteries as a secondary power source than conventional techniques to recover from short duration power interruptions. It is further contemplated that aspects as disclosed herein enable reduced power consumption of secondary or back-up power sources, while enabling faster resume or "warm start" times as compared to conventional devices and methods.

To the extent not already described, the different features and structures of the various embodiments can be used in combination with each other as desired. That one feature is not illustrated in all of the embodiments is not meant to be construed that it may not be included, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure may also be embodied in any permutation of aspects of the disclosure, including but not limited to the following technical solutions as defined in the enumerated aspects:

A CVFDR system couplable to a data communications network, the system comprising: a control module comprising a processor and coupleable to a remote first power source to receive a first voltage therefrom; a first memory communicatively coupled to the processor; a second memory communicatively coupled to the processor; a second power source coupled to the control module, the control module configured to operate in a normal mode of operation comprising providing power to the processor, executing program code read from the first memory, receiving data from the communications network, and transmitting the received data to the second memory, the second power source configured to provide a second voltage to the control module for a first predetermined period in response to an interruption of the first voltage; wherein, at a conclusion of the first predetermined period, the control module is configured to operate in an economy mode of operation comprising suspending the receiving data from the communications network for a second predetermined period.

The CVFDR system of any preceding clause, wherein in response to a restoration of the first voltage received from the remote first power source during the second predetermined period, the processor is configured to transition to the normal mode of operation including executing the program code read from the first memory and resuming a receipt of data from the communications network.

The CVFDR system of any preceding clause, wherein the economy mode of operation includes placing the first memory in a self-refresh mode.

The CVFDR system of any preceding clause, wherein the processor includes a set of central processing units (CPU), and wherein the economy mode of operation further includes ceasing providing power to at least one CPU for the second predetermined period.

The CVFDR system of any preceding clause, wherein the processor includes a set of integrated peripheral controllers, and wherein the economy mode of operation includes ceasing providing power to at least one of the integrated peripheral controllers for the predetermined second period.

The CVFDR system of any preceding clause, wherein the first predetermined period is based on a rate of decay of the second voltage with respect to time.

The CVFDR system of any preceding clause, wherein the control module is further communicatively coupled to a flight recorder module via the data communications network, and wherein the received data is provided by the flight recorder module.

The CVFDR system of any preceding clause, wherein the first memory is a synchronous dynamic random-access memory.

The CVFDR system of any preceding clause, wherein the second memory is remote from the CVFDR.

The CVFDR system of any preceding clause, wherein the second memory is one of NOR Flash or NAND Flash memory.

The CVFDR system of any preceding clause, wherein the first voltage and the second voltage are selectively provided to the CVFDR via a power controller device.

A method of operating a CVFDR system of an aircraft, including a CVFDR having a control module comprising a processor communicatively coupled to a first memory and a second memory, the method comprising: receiving, by the processor, a first voltage from a first power source remote from the CVFDR; executing, by the processor, program code read from the first memory; receiving, by the processor, a data signal indicative of operational data from a communications network; transmitting the operational data to the second memory; receiving a second voltage from a second power source in response to an interruption of the first voltage; operating the processor in a normal mode of operation for a first predetermined period; and at a conclusion of the first predetermined period, operating the processor in an economy mode of operation for a second predetermined period.

The method of any preceding clause, further comprising, in response to a restoration of the first voltage received from the first power source during the second predetermined period, resuming operation of the processor in accordance with the normal mode of operation.

The method of any preceding clause, wherein operating the processor in the economy mode of operation includes placing the first memory in a self-refresh mode, and wherein resuming operation of the processor in accordance with the normal mode of operation includes resuming execution of the program code read from the first memory.

The method of any preceding clause, wherein operating the processor in the economy mode of operation includes suspending receiving the data signal by the processor, and wherein resuming operation of the processor in accordance with the normal mode of operation includes resuming receiving the data signal by the processor.

The method of any preceding clause, wherein the processor includes a set of CPUs, and operating the processor in the economy mode of operation includes suspending providing power to at least one CPU for the second predetermined period, and wherein resuming operation of the processor in accordance with the normal mode of operation includes providing power to the at least one CPU.

The method of any preceding clause, wherein the processor includes a set of integrated peripheral controllers, and wherein operating the processor in the economy mode of operation includes suspending providing power to at least one of the integrated peripheral controllers for the second predetermined period and wherein resuming operation of the processor in accordance with the normal mode of operation includes providing power to the at least one of the integrated peripheral controllers.

The method of any preceding clause, wherein the second power source is a capacitor.

The method of any preceding clause, wherein the first predetermined period is based on a rate of decay of the second voltage with respect to time.

The method of any preceding clause, wherein the data signal indicative of operational data is provided by a flight recorder module.

A non-transitory computer readable medium comprising instructions that, when executed, cause a processor to at least: receive a first voltage from a first power source remote from the processor; execute program code read from a first memory; receive a data signal indicative of operational data from a communications network; transmit the operational data to a second memory; receive a second voltage from a second power source in response to an interruption of the first voltage; operate in a normal mode of operation for a first predetermined period; and at a conclusion of the first predetermined period, operate in an economy mode of operation for a second predetermined period.

The non-transitory computer readable medium of any preceding clause, further comprising instructions that, when executed, cause the processor to, in response to a restoration of the first voltage received from the first power source during the second predetermined period, resume operation of the processor in accordance with the normal mode of operation.

The non-transitory computer readable medium of any preceding clause, wherein operating in the economy mode of operation includes placing the first memory in a self-refresh mode, and wherein resuming operation of the processor in accordance with the normal mode of operation includes resuming execution of the program code read from the first memory.

The non-transitory computer readable medium of any preceding clause, wherein operating in the economy mode of operation includes suspending receiving the data signal, and wherein resuming operation in accordance with the normal mode of operation includes resuming receiving the data signal by the processor.

The non-transitory computer readable medium of any preceding clause, wherein the processor includes a set of CPUs, and operating in the economy mode of operation includes suspending providing power to at least one CPU for the second predetermined period, and wherein resuming operation in accordance with the normal mode of operation includes providing power to the at least one CPU.

The non-transitory computer readable medium of any preceding clause, wherein the processor includes a set of integrated peripheral controllers, and wherein operating in the economy mode of operation includes suspending providing power to at least one of the integrated peripheral controllers for the second predetermined period and wherein resuming operation in accordance with the normal mode of operation includes providing power to the at least one of the integrated peripheral controllers.

The non-transitory computer readable medium of any preceding clause, wherein the second power source is a capacitor.

The non-transitory computer readable medium of any preceding clause, wherein the first predetermined period is based on a rate of decay of the second voltage with respect to time.

The non-transitory computer readable medium of any preceding clause, wherein the data signal indicative of operational data is provided by a flight recorder module.

What is claimed is:

1. A cockpit voice and flight data recorder (CVFDR) system couplable to a data communications network, the CVFDR system comprising:

a control module comprising a processor and coupleable to a remote first power source to receive a first voltage therefrom;

a first memory communicatively coupled to the processor;

a second memory communicatively coupled to the processor;

a second power source coupled to the control module, the control module configured to operate in a normal mode of operation comprising providing power to the processor, executing program code read from the first memory, receiving data from the communications network, and transmitting the received data to the second memory, the second power source configured to provide a second voltage to the control module for a first predetermined period in response to an interruption of the first voltage; and wherein, at a conclusion of the first predetermined period, the control module is configured to operate in an economy mode of operation comprising suspending receiving data from the communications network for a second predetermined period; and wherein the processor includes a set of integrated peripheral controllers, and wherein the economy mode of operation includes ceasing providing power to at least one of the integrated peripheral controllers for the predetermined second period.

2. The CVFDR system of claim 1, wherein in response to a restoration of the first voltage received from the remote first power source during the second predetermined period, the processor is configured to transition to the normal mode of operation including executing the program code read from the first memory and resuming a receipt of data from the communications network.

3. The CVFDR system of claim 1, wherein the economy mode of operation includes placing the first memory in a self-refresh mode.

4. The CVFDR system of claim 1, wherein the processor includes a set of central processing units (CPU), and wherein the economy mode of operation further includes ceasing providing power to at least one CPU for the second predetermined period.

5. The CVFDR system of claim 1, wherein the first predetermined period is based on a rate of decay of the second voltage with respect to time.

6. The CVFDR system of claim 1, wherein the control module is further communicatively coupled to a flight recorder module via the data communications network, and wherein the received data is provided by the flight recorder module.

7. The CVFDR system of claim 1, wherein the first memory is a synchronous dynamic random-access memory.

8. The CVFDR system of claim 1, wherein the second memory is remote from the CVFDR.

9. The CVFDR system of claim 1, wherein the second memory is one of NOR Flash or NAND Flash memory.

10. The CVFDR system of claim 1, wherein the first voltage and the second voltage are selectively provided to the CVFDR via a power controller device.

11. A method of operating a CVFDR system of an aircraft, including a CVFDR having a control module comprising a processor communicatively coupled to a first memory and a second memory, the method comprising:

receiving, by the processor, a first voltage from a first power source remote from the CVFDR;

executing, by the processor, program code read from the first memory;

receiving, by the processor, a data signal indicative of operational data from a communications network;

transmitting the operational data to the second memory;

receiving a second voltage from a second power source in response to an interruption of the first voltage;

operating the processor in a normal mode of operation for a first predetermined period;

and at a conclusion of the first predetermined period, and operating the processor in an economy mode of operation for a second predetermined period;

wherein the processor includes a set of integrated peripheral controllers, and wherein operating the processor in the economy mode of operation includes suspending providing power to at least one of the integrated peripheral controllers for the second predetermined period.

12. The method of claim 11, further comprising, in response to a restoration of the first voltage received from the first power source during the second predetermined period, resuming operation of the processor in accordance with the normal mode of operation.

13. The method of claim 12, wherein operating the processor in the economy mode of operation includes placing the first memory in a self-refresh mode, and wherein resuming operation of the processor in accordance with the normal mode of operation includes resuming execution of the program code read from the first memory.

14. The method of claim 12, wherein operating the processor in the economy mode of operation includes suspending receiving the data signal by the processor, and wherein resuming operation of the processor in accordance with the normal mode of operation includes resuming receiving the data signal by the processor.

15. The method of claim 12, wherein the processor includes a set of CPUs, and operating the processor in the economy mode of operation includes suspending providing power to at least one CPU for the second predetermined period, and wherein resuming operation of the processor in accordance with the normal mode of operation includes providing power to the at least one CPU.

16. The method of claim 12, wherein resuming operation of the processor in accordance with the normal mode of operation includes providing power to the at least one of the integrated peripheral controllers.

17. The method of claim 11, wherein the second power source is a capacitor.

18. The method of claim 11, wherein the first predetermined period is based on a rate of decay of the second voltage with respect to time.

19. The method of claim 11, wherein the data signal indicative of operational data is provided by a flight recorder module.

* * * * *